No. 627,593. Patented June 27, 1899.
J. H. PETERSON.
ELASTIC WHEEL FOR VEHICLES.
(Application filed Sept. 27, 1898.)
(No Model.)
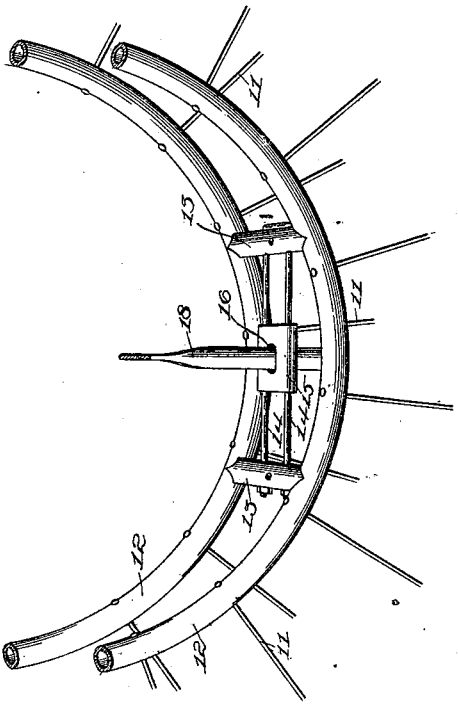
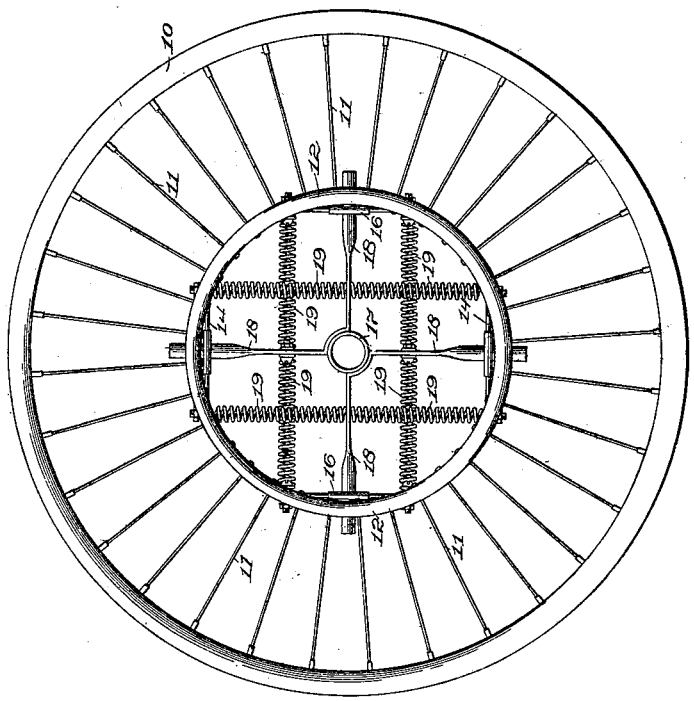
Witnesses:
Jas Barels.
Thomas G. Orwig.
Inventor:
Jacob H. Peterson

UNITED STATES PATENT OFFICE.

JACOB H. PETERSON, OF DES MOINES, IOWA.

ELASTIC WHEEL FOR VEHICLES.

SPECIFICATION forming part of Letters Patent No. 627,593, dated June 27, 1899.

Application filed September 27, 1898. Serial No. 691,995. (No model.)

*To all whom it may concern:*

Be it known that I, JACOB H. PETERSON, a citizen of the United States, residing at Des Moines, in the county of Polk and State of Iowa, have invented a new and useful Elastic Wheel for Vehicles, of which the following is a specification.

The object of this invention is to provide a vehicle-wheel of simple, strong, durable, and inexpensive construction in which the hub is suspended within the rim upon springs to thereby absorb all the vibration caused by the rim passing over uneven surfaces; and my object is more specifically to provide a wheel of this class in which lateral movement of the hub relative to the rim is prevented, friction reduced to a minimum, and the springs so arranged as to absorb the vibration and also to store up power applied to the axle during the effective stroke of the pedals, as in a bicycle, and transmit said power to the rim as the application of power to the pedals decreases.

My invention consists, essentially, in the construction, arrangement, and combination of the means for preventing a lateral movement of the hub relative to the rim and the arrangement and combination with these means of the springs, as hereinafter more fully set forth, pointed out in my claims, and illustrated in the accompanying drawings, in which—

Figure 1 shows a complete wheel in side elevation, and Fig. 2 shows a detail perspective of a portion of the wheel to illustrate one of the devices for preventing lateral movement of the hub.

Referring to the accompanying drawings, the reference-numeral 10 is used to indicate the wheel-rim, and 11 the spokes, attached thereto in an ordinary way. They extend, however, only a short distance and are attached to a concentric rim, which is preferably constructed, as shown, of two tubular rings 12, placed side by side and connected by means of the cross-pieces 13, of which there are preferably four pairs. To each of said pairs of cross-pieces the parallel guide-rods 14 are fixed, and on each pair of guide-rods a sliding block 15, having the elongated opening 16 in its central portion, is mounted for longitudinal movement.

A hub 17 of ordinary construction is placed in the center of the wheel, and to the hub four radially-extending arms 18 are fixed. These arms are of a length to pass through the slots 16 of the blocks 15.

I have arranged for the support of the hub within the rim as follows: To each of the said cross-pieces 13 I have fixed a coil-spring 19 to extend inwardly parallel with the adjacent radial arm 18 and with the inner end fixed to the radial arm, which extends at right angles thereto.

It is obvious, in the first instance, that the fixed radial arms inserted in the blocks 15 will absolutely prevent a lateral movement of the hub in the rim, but will not prevent a movement in the plane of the sides of the rim. Furthermore, the hub is supported in position within the rim by means of said springs. Assuming that a weight were applied to the hub when in the position shown in Fig. 1, it is obvious that the two vertical springs below the hub will be compressed and the ones above distended and that as soon as this pressure is released the springs will return the hub to position. Assuming that power was applied to the hub to rotate the wheel, every spring would be effected, half of them compressed and the rest distended. Hence power would be stored therein to be exerted in propelling the rim as soon as the pressure was released partially, so that the springs could assume a normal condition.

Having thus described the wheel, what I claim, and desire to secure by Letters Patent of the United States therefor, is—

1. In a vehicle-wheel the combination of a hub, a series of radial arms fixed thereto, two springs fixed to each radial arm, on opposite sides thereof and extended at right angles therefrom, a rim arranged concentrically of the hub, means connected with the rim and designed to receive the radial arms and permit their circumferential movement but prevent a lateral movement thereof, said rim having each of said springs fixed thereto, for the purposes stated.

2. A vehicle-wheel, comprising an outer rim, an inner rim composed of two tubular rings, spokes for connecting the outer and inner rims and cross-pieces for connecting the said rings, parallel rods between the cross-pieces, a sliding block on each pair of rods, a hub, radial arms fixed to the hub and passed through said blocks, and springs fixed to the radial arms and the cross-pieces substantially as and for the purposes stated.

JACOB H. PETERSON.

Witnesses:
    JAS. BARELS,
    THOMAS G. ORWIG.